United States Patent
Shikata

(10) Patent No.: US 7,667,864 B2
(45) Date of Patent: Feb. 23, 2010

(54) PRINTER HOST, RECORDING MEDIUM HAVING RECORDED THEREIN PRINTING-APPARATUS-STATE-INFORMATION DISPLAY PROGRAM, AND STATE INFORMATION DISPLAY METHOD FOR PRINTING APPARATUS IN PRINTER HOST

(75) Inventor: Yukiko Shikata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 760 days.

(21) Appl. No.: 11/260,384

(22) Filed: Oct. 28, 2005

(65) Prior Publication Data
US 2006/0092460 A1 May 4, 2006

(30) Foreign Application Priority Data
Nov. 2, 2004 (JP) ............................. 2004-319607

(51) Int. Cl.
*G06F 15/00* (2006.01)
*G06F 3/00* (2006.01)

(52) U.S. Cl. ...................... 358/1.15; 715/733; 715/736; 715/737; 715/738

(58) Field of Classification Search ................ 358/1.15, 358/1.16; 715/733, 736–738
See application file for complete search history.

(56) References Cited

U.S. PATENT DOCUMENTS

| 6,813,037 B1* | 11/2004 | Collard ...................... 358/1.15 |
| 2004/0218212 A1* | 11/2004 | Jang et al. .................. 358/1.15 |
| 2005/0018236 A1* | 1/2005 | Shirai et al. ................ 358/1.14 |

FOREIGN PATENT DOCUMENTS

| JP | 11-353075 A | 12/1999 |
| JP | 2000-293336 A | 10/2000 |
| JP | 2001-117734 A | 4/2001 |
| JP | 2003-316545 A | 11/2003 |

* cited by examiner

*Primary Examiner*—Chan S Park
(74) *Attorney, Agent, or Firm*—Sughrue Mion, PLLC

(57) ABSTRACT

A printer host connected to plural printing apparatuses includes state information acquiring means which are provided to correspond to the printing apparatuses and each of state information acquiring means acquires state information of the corresponding printing apparatus and a state information managing means which manages the state information acquiring means. The state information managing means causes, when a predetermined first instruction is received, the state information acquiring means to acquire state information concerning printing apparatuses which are executing printing, and displays predetermined information included in the state information. Consequently, usefulness of information to be displayed is improved in the printer host which displays state information of the plural printing apparatuses.

6 Claims, 5 Drawing Sheets

PRINTER HOST, RECORDING MEDIUM HAVING RECORDED THEREIN PRINTING-APPARATUS-STATE-INFORMATION DISPLAY PROGRAM, AND STATE INFORMATION DISPLAY METHOD FOR PRINTING APPARATUS IN PRINTER HOST

BACKGROUND OF THE INVENTION

The present invention relates to a printing system, and, in particular, to a printer host which displays state information of a printing apparatus.

A printer state display program (a status monitor) is known as software which displays a state of a printer in a host computer connected to the printer.

Japanese Patent Application Laid-open Publication No. 2000-293336 (hereinafter, referred to as Patent Document 1) discloses a technique which makes it possible to manage, when plural printers are connected to a host computer, the plural printers simultaneously and recognize changes in states of the respective printers.

However, in the technique disclosed in the Patent Document 1, since items of information on states of the respective printers, which can be recognized, are fixed, it is impossible to flexibly select items of information which a user can recognize.

SUMMARY OF THE INVENTION

It is an object of the present invention to improve usefulness of information to be displayed in a printer host which displays state information of plural printing apparatuses.

A printer host, which is a first aspect of the invention for solving the problem described above, is a printer host connected to plural printing apparatuses, including:

state information acquiring means which are provided to correspond to the printing apparatuses and each of the state information acquiring means acquires state information of the corresponding printing apparatus; and state information managing means which manages the state information acquiring means, wherein the state information managing means causes, when a predetermined first instruction is received, the state information acquiring means to acquire state information concerning printing apparatuses, which are executing printing, and displays predetermined information included in the state information.

According to the invention, it is possible to cause the printer host to display state information concerning printing apparatuses, for which the printer host is executing printing, all together and it is possible to provide information useful for a user.

The state information managing means can display, when a predetermined second instruction is received, a screen for receiving designation of a printing apparatus and information which should be displayed, cause, when there is no printing apparatus which is executing printing at the time when the predetermined first instruction is received, the state information acquiring means to acquire state information concerning the printing apparatus designated, and display the information designated among pieces of information included in the state information.

The predetermined first instruction can be double clicking on an icon corresponding to the state managing means.

Moreover, the predetermined information included in the state information can be information schematically indicating states of the printing apparatuses.

In the designation of information which should be displayed, it is possible to select information schematically indicating states of the printing apparatuses, information indicating states of expendables, or information indicating a reception situation of a print job.

A recording medium having recorded therein a printing-apparatus-state-information display program, which is a second aspect of the invention for solving the problem, is a recording medium having recorded therein a printing-apparatus-state-information display program which is executed in a printer host connected to plural printing apparatuses, wherein the program causes the printer host to function as:

state information acquiring means which are provided to correspond to the printing apparatuses and each of the information acquiring means acquires status information of the corresponding printing apparatus; and state information managing means which manages the state information acquiring means, and the state information managing means acquires, when a predetermined instruction is received, state information concerning printing apparatuses which are executing printing and displays predetermined information included in the state information.

A state information display method, which is a third aspect of the invention for solving the problem, is a state information display method for a printing apparatus in a printer host connected to plural printing apparatuses, the state information display method including:

a step in which the printer host receives a predetermined instruction;

a step of specifying printing apparatuses which are executing printing;

a step of acquiring state information concerning the printing apparatuses specified which are executing printing; and a step of displaying predetermined information included in the state information acquired.

DETAILED DESCRIPTION OF THE PREFERRED EMBODIMENTS

An embodiment of the invention will be explained with reference to the drawings.

Figure 1:
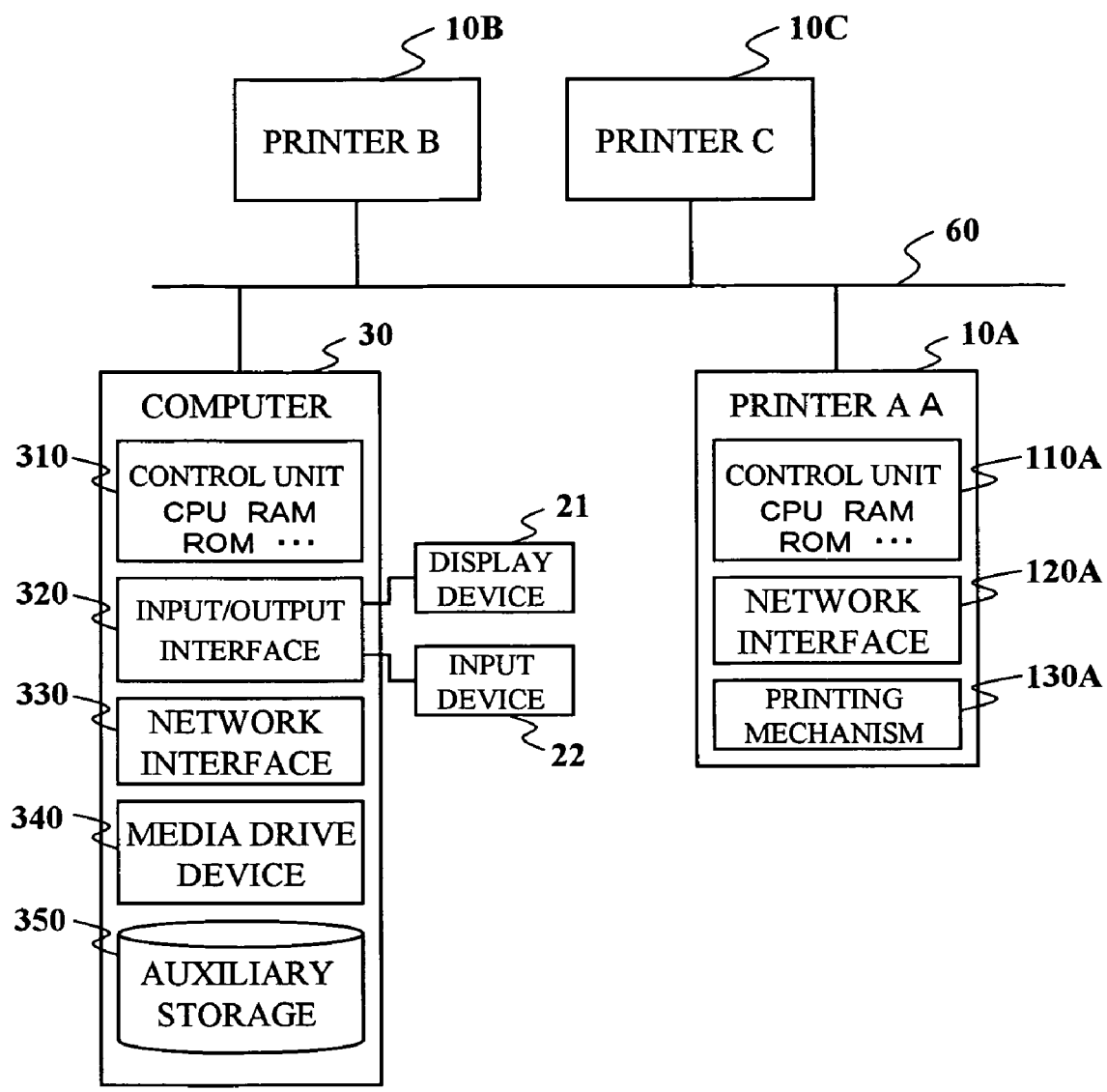
FIG. 1 is a block diagram for explaining a hardware configuration of a printing system.

FIG. 1 is a block diagram for schematically explaining a hardware configuration of a printing system to which the present invention is applied.

As shown in the figure, in the printing system, a computer 30 for realizing various kinds of processing by application software, print processing by a printer driver, a user interface via an input/output device, and the like is connected to plural printers 10 (10A, 10B, and 10C).

In this embodiment, it is assumed that the computer 30 is connected to the respective printers 10 through a computer network 60. However, the computer 30 may be connected to the respective printers 10 through plural ports. A display device 21 such as a color display, an input device 22 such as a mouse and a keyboard, and the like are connected to a main body of the computer 30. Note that a configuration of the printing system is not limited to this.

In this embodiment, the computer 30 functions as a printer host which generates print data, transmits the print data to the printers 10, manages states of the printers 10, and displays state information (status).

A printer driver program and a status monitor program, which are computer programs for causing the computer 30 to function as a printer host, are generally developed by a manufacturer of the printer 10 to correspond to a model of the printer 10. The printer driver program and the status monitor program are recorded in a recording medium such as a CD-ROM and distributed. Alternatively, the printer driver program and a status monitor program are circulated via a computer network such as the Internet. It is also possible to develop the status monitor program to be included in the printer driver program. These programs are installed in the computer 30 and executed to realize functions described later.

It is possible to use, for example, a general-purpose information processing apparatus such as a personal computer as the computer 30. In this embodiment, the computer 30 includes a control unit 310 including a Central Processing Unit (CPU) which executes various programs, a Random Access Memory (RAM) which temporarily stores data, programs, and the like, and a Read Only Memory (ROM) in which various data, various programs, and the like for controlling the computer 30 are stored in advance in a nonvolatile manner, an input/output interface 320 for connecting the computer 30 to the display device 21, the input device 22, and the like, a network interface 330 for connecting the computer 30 to the computer network 60, a media drive device 340 for accessing a recording medium such as a CD-ROM, and an auxiliary storage 350 such as a hard disk. It goes without saying that a configuration of the computer 30 is not limited to this.

The printer 10 may be, for example, a page printer including a print mechanism of a laser system. The page printer of the laser system includes a toner cartridge which contains a toner in a housing. The page printer of the laser system performs printing by transferring the toner onto a print medium such as a print sheet. Note that the printer 10 may be a color laser printer or a monochrome laser printer. For example, a printer of an ink-jet system may be used instead of the printer of the laser system.

The printer 10 includes a control unit 110 which includes a CPU, a RAM, and a ROM and controls various kinds of processing in the printer 10, a network interface 120 for connecting the printer 10 to the computer network 60, and a printing mechanism 130 including print mechanisms such as a toner cartridge, a photosensitive drum, and a laser beam irradiating mechanism, and a sheet feeding and discharging mechanism. It goes without saying that a configuration of the printer 10 is not limited to this.

Figure 2:
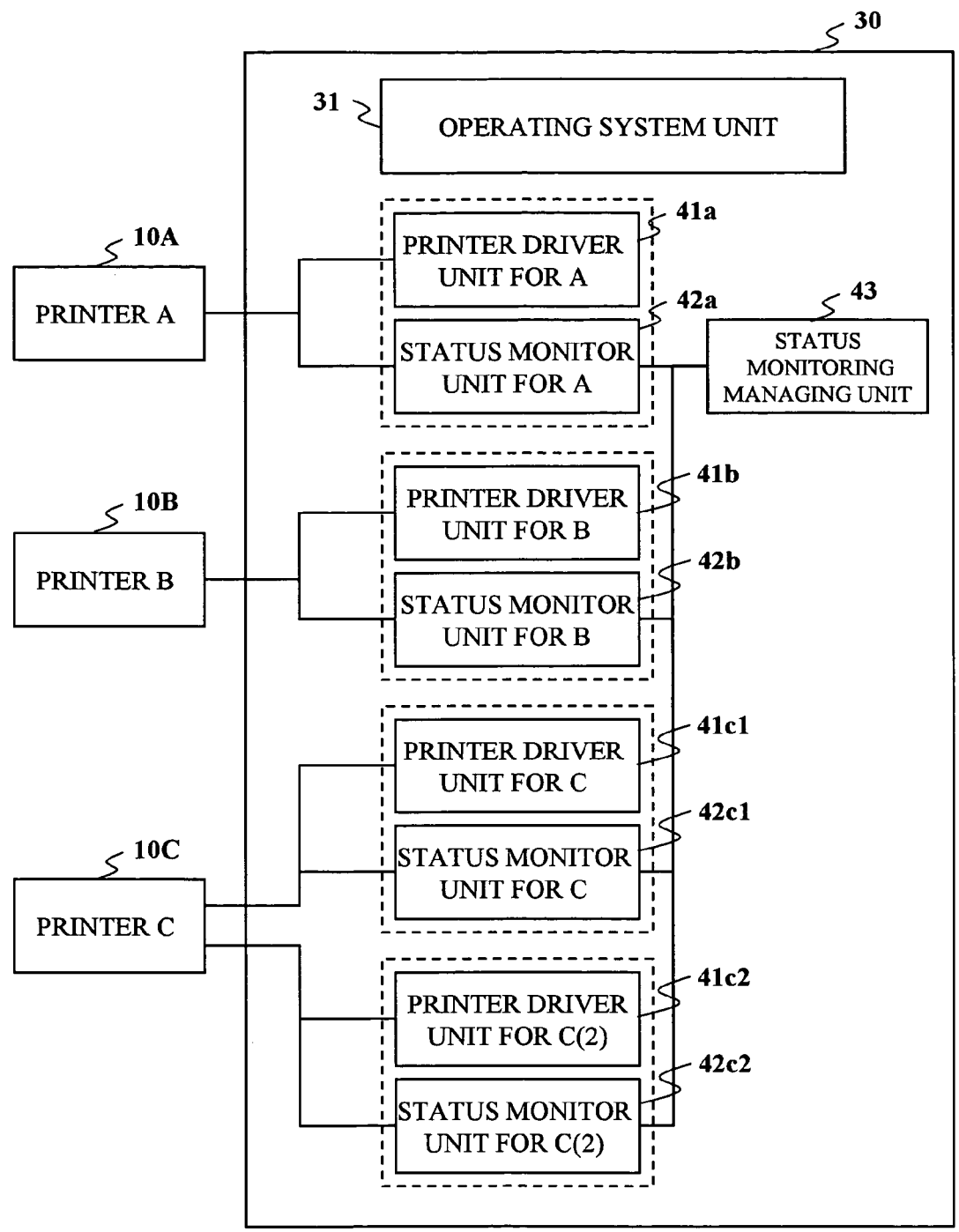
FIG. 2 is a block diagram showing a functional configuration of a computer.

FIG. 2 is a block diagram showing a functional configuration of the computer 30 to which the present invention is applied. In the figure, a functional configuration of the computer 30 connected to the three printers 30 through a network is shown.

As shown in the figure, the computer 30 includes an operating system unit 31, plural pairs of printer driver units 41 and status monitoring units 42, and a status monitoring managing unit 43.

The printer driver units 41 and the status monitoring units 42 are installed in the computer 30 in pairs to correspond to the printers 10 connected to the computer 30. It is also possible to install the plural printer driver units 41 (a printer driver for C 41c1, a printer driver 41c2 for C(2)), which have different basic settings, and the plural status monitoring unit 42 (a status monitoring unit for C 42c1, a status monitoring unit for C 42c2), which have different basic settings, in pairs, respectively, for one printer 10 (the printer 10C in an example in the figure)

At the time of printing, by designating any one of the printer driver units 41, a user can execute printing in the printer 10 corresponding to the printer driver unit 41. In addition, at this point, the status monitoring unit 42 corresponding to the printer 10 is started by the printer driver unit 41.

The operating system unit 31 is so-called basic software which controls a basic user interface, file management, and the like for the computer 30. The printer driver units 41, the status monitoring unit 42, and the status monitoring managing unit 43 are functional units which operates on the operating system 31.

The printer driver unit 41 performs processing for causing the printers 10 to print a document created by not-shown application software.

The status monitoring unit 42 performs communication with the printer 10 corresponding to the status monitoring unit 42, acquires information on a status of the printer 10, and displays the information on the display device 21 if necessary. The information on the status of the printer 10 acquired by the status monitoring unit 42 can include states of expendables, an error occurrence situation, and a print job reception situation.

The status monitoring managing unit 43 is established on the computer 30 by a status monitoring program in the same manner as the status monitoring unit 42. It is possible to set the status monitoring managing unit 43 as a functional unit which is installed simultaneously when a status monitoring program is installed first and is basically resident in the operating system unit 31.

Figure 3:
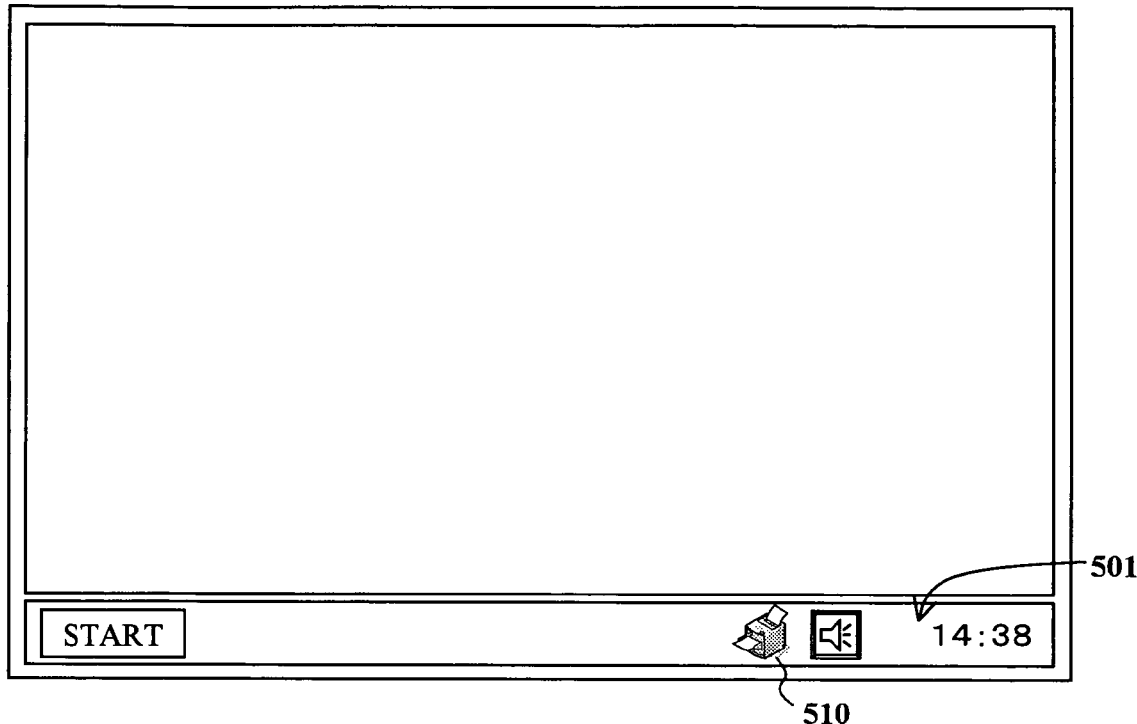
FIG. 3 is a diagram showing a display screen of an icon corresponding to a status monitor managing unit.

Therefore, as indicated by a display screen 500 shown in FIG. 3, an icon 510 corresponding to the status monitoring managing unit 43 is always displayed in an active program display area 501 provided by the operating system unit 31 (e.g., in a task tray of a task bar in Windows (registered trademark) of Microsoft corporation).

The icon 510 corresponding to the status monitoring managing unit 43 represents an icon corresponding to the status monitoring unit 42. Even when the plural status monitoring units 42 are active, that is, even when the plural printers 10 are executing printing, icons corresponding to the respective status monitoring units 42 are not displayed and only the icon 510 corresponding to the status monitoring managing unit 43 is displayed.

Processing in the case in which the icon 510 corresponding to the status monitoring unit 43 receives operation from a user will be explained.

Figure 4:
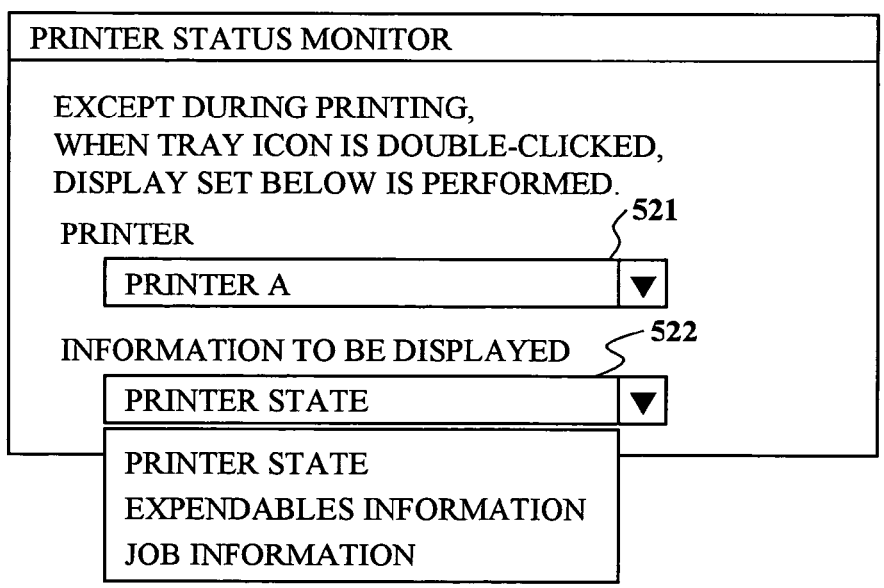
FIG. 4 is a diagram showing a reception screen in an initial setting.

First, reception of an initial setting will be explained. When the icon 510 corresponding to the status monitoring managing unit 43 receives predetermined operation, for example, right click of a mouse serving as the input device 22 from a user, the status monitoring managing unit 43 displays a reception screen 520 for an initial setting shown in FIG. 4 on the display device 21.

On the reception screen 520 for an initial setting, it is possible to set information which is to be displayed when the icon 510 corresponding to the status monitoring setting unit 43 is double-clicked in the case in which the status monitoring unit 42 is not operating, that is, none of the printers 10 is performing print processing.

In the example in the figure, it is possible to designate the printer 10 in a printer designation space 521 and designate information, which is displayed for the designated printer 10, in an information-to-be-displayed designation space 522.

In this embodiment, the user can cause the display device 21 to display information designated in advance for the printer 10 designated in advance by double-clicking the icon 510 corresponding to the status monitor managing unit 43 in the case in which the computer 30 is not performing print processing.

In the printer designation space 521, it is possible to select a printer arbitrarily from the printers 10 (10A, 10B, and 10C) monitored by the status monitoring unit 42 connected to the computer 30.

In the information-to-be-displayed designation space 522, it is possible to designate any one of a "printer state", "expendables information", and "job information" as an item of information. The "printer state" can be information schematically indicating a printability state, failure information, and the like of the printers 10. The "expendables information" can be information indicating a degree of wear of expendables provided in the printers 10. The "job information" can be information indicating a reception state of a print job. However, these pieces of information are examples and information other than these pieces of information may be designated.

Figure 5:
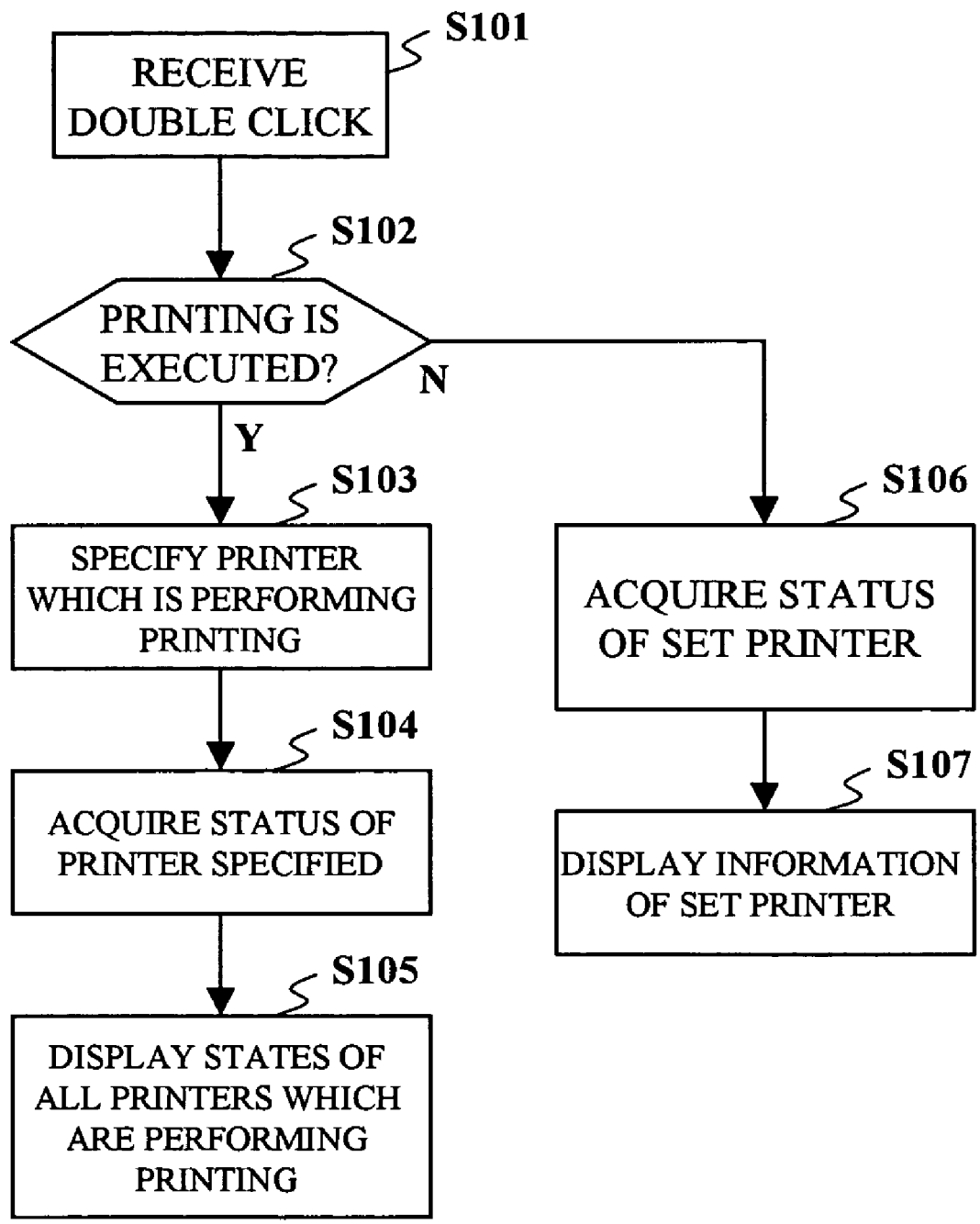
FIG. 5 is a flow diagram for explaining processing at the time when an icon receives predetermined operation.

Processing in the case in which the icon 510 corresponding to the status monitoring managing unit 43 receives a predetermined operation, for example, double click from a user will be explained with reference to a flow diagram in FIG. 5.

In this embodiment, when the icon 510 corresponding to the status monitoring managing unit 43 receives double click, information to be displayed is varied according to whether the computer 30 is executing printing.

Therefore, when the icon 510 corresponding to the status monitoring managing unit 43 receives double click (S101), the status monitoring managing unit 43 judges whether the computer 30 is executing printing (S102).

First, a case in which the computer 30 is executing printing (S102:Y) will be explained. In this case, the status monitoring managing unit 43 specifies the printer 10 which is performing print processing (S103). This can be performed by, for example, detecting the active status monitoring unit 42. Since the plural printers 10 are connected to the computer 30, it is possible that the computer 30 is applying printing to the plural printers 10. In this case, the status monitoring managing unit 43 specifies all the printers 10 which are performing print processing.

Then, the status monitoring managing unit 43 acquires status information of the printer 10 specified (S104). When the computer 30 is applying printing to the plural printers 10, status information is acquired from the respective printers 10. The status monitoring units 42 corresponding to the respective printers 10 perform this processing.

When status information is acquired from the printer 10 which is performing printing, the status monitoring managing unit 43 displays information on a "printer state" of the printer 10 on the basis of the status information (S105). When the computer 30 is applying printing to the plural printers 10, the status monitoring managing unit 43 displays all pieces of information on "printer states" for the respective printers 10.

Figure 6:
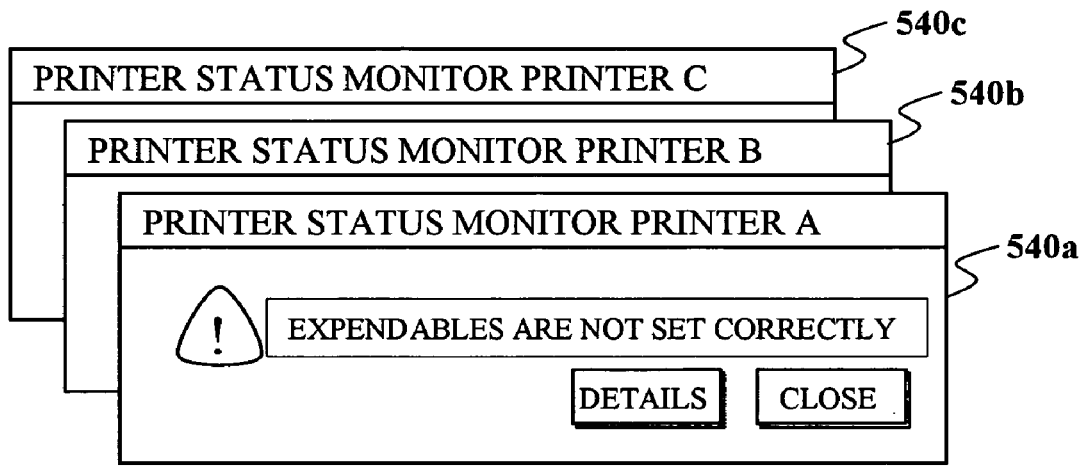
FIG. 6 is a diagram showing a screen on which information on a "printer state" is displayed.

FIG. 6 is a diagram showing an example of a screen 540 on which information on a "printer state" is displayed. In the example in the figure, the computer 30 is applying printing to three printers. Three screens (540a, 540b, and 540c), on which information on "printer states" are displayed, are displayed. For example, on the screen 540a on which information on a "printer state" is displayed, information "expendables are not set correctly" is displayed as a state of a printer.

Note that, in this example, the status monitoring managing unit 43 causes the computer 30 to display a "printer state" for the printer 10 to which the computer 30 is applying printing. However, the status monitoring managing unit 43 may cause the computer 30 to display a "printer state" for the printer 10 to which the computer 30 is not applying printing.

When another computer is connected to the computer network 60, the status monitoring managing unit 43 may cause the another computer to display a "printer state" for the printer 10 to which the another computer is applying printing.

A user may be allowed to designate the printer 10 for which the status monitoring managing unit 43 causes the computer 30 to display a "printer state". The status monitoring managing unit 43 may cause the computer 30 to display status information other than a "printer state".

A case in which the computer 30 is not executing printing (S102: N) will be explained. In this case, a status of the printer 10 set in an initial setting is acquired. The status monitor unit 42 corresponding to the printer 10 designated in the initial setting performs this processing.

Figure 7:
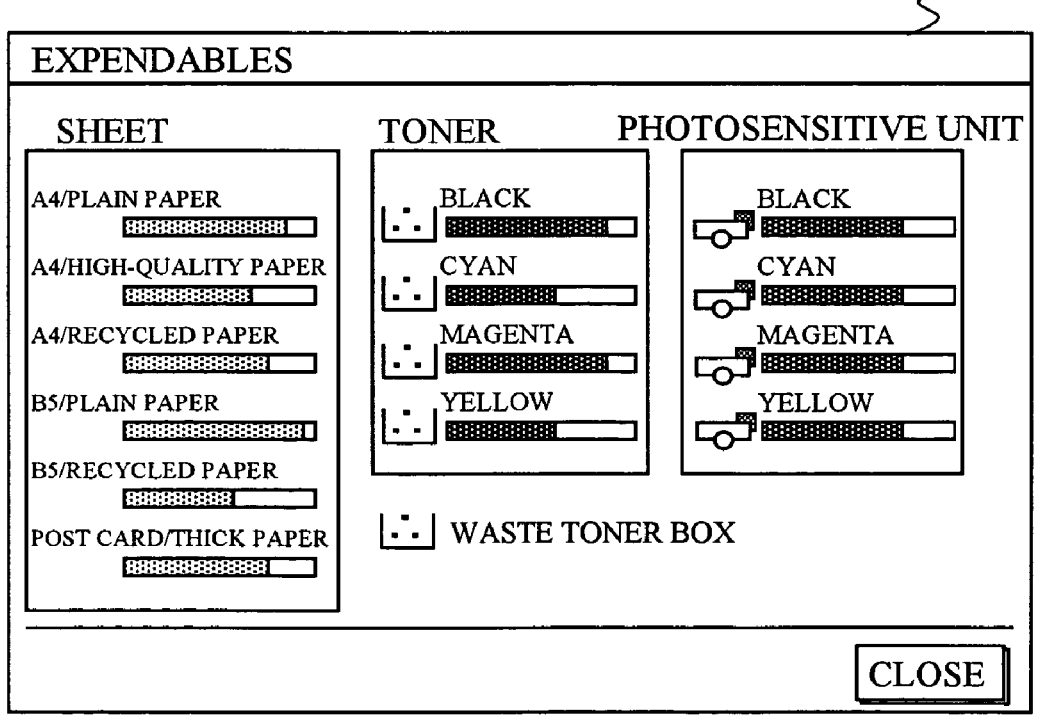
FIG. 7 is a diagram showing a screen on which information on "expendables information" is displayed.

For the printer 10, the status monitoring managing unit 43 causes the display device 21 to display information designated in the initial setting. FIG. 7 is a diagram showing an example of an expendables information display screen 560 to be displayed when "expendables information" is designated in the initial setting.

As described above, in this embodiment, when the icon 510 corresponding to the status monitoring managing unit 43 receives double click when printing is not performed, the status monitoring managing unit 43 displays information designated in advance of the printer 10 designated in advance.

However, information on all the printers 10 connected may be displayed or information to be displayed may be a "printer state" or the like.

What is claimed is:

1. A printer host connected to plural printing apparatuses, comprising:

state information acquiring means which are provided to correspond to the printing apparatuses, wherein each of the information acquiring means acquires state information of the corresponding printing apparatus; and state information managing means which manages the state information acquiring means, wherein the state information managing means judges whether or not the printer host is executing printing when a predetermined first instruction is received, causes the state information acquiring means to acquire state information concerning printing apparatuses which are performing printing and for which the printer host is executing printing if it is judged that the printer host is executing printing, and displays predetermined information included in the state information of only the printing apparatuses which are performing printing and for which the printer host is executing printing, and wherein the state information managing means displays a screen for receiving designation of a printing apparatus and information which should be displayed when a predetermined second instruction is received, and if the printer host is not executing printing for any printing apparatus at the time when the predetermined first instruction is received, the state information managing means causes the state information acquiring means to acquire state information concerning the printing apparatus designated, and displays the information designated among pieces of information included in the state information.

2. A printer host according to claim 1, wherein the predetermined first instruction is double clicking on an icon corresponding to the state information managing means.

3. A printer host according to claim 1, wherein the predetermined information included in the state information is information schematically indicating states of the printing apparatuses.

4. A printer host according to claim 1, wherein in the designation of information which should be displayed, it is possible to select the information from among information schematically indicating state of the printing apparatuses, information indicating states of expendables, or information indicating a reception situation of a print job, wherein display of the information is executed directly via an icon.

5. A recording medium having recorded therein a printing-apparatus-state-information display program which is executed in a printer host connected to plural printing apparatuses, wherein the program causes the printer host to function as:

state information acquiring means which are provided to correspond to the printing apparatuses, wherein each of the information acquiring means acquires status information of the corresponding printing apparatus; and state information managing means which manages the state information acquiring means, wherein the state information managing means judges whether or not the printer host is executing printing when a predetermined first instruction is received, acquires state information concerning printing apparatuses which are performing printing and for which the printer host is executing printing if it is judged that the printer host is executing printing, and displays predetermined information included in the state information of only the printing apparatuses which are performing printing and for which the printer host is executing printing, and wherein the state information managing means displays a screen for receiving designation of a printing apparatus and information which should be displayed when a predetermined second instruction is received, and if the printer host is not executing printing for any printing apparatus at the time when the predetermined first instruction is received, the state information managing means causes the state information acquiring means to acquire state information concerning the printing apparatus designated, and displays the information designated among pieces of information included in the state information.

6. A method of displaying state information for a printing apparatus in a printer host connected to plural printing apparatuses, comprising:

receiving a predetermined first instruction;

judging whether or not the printer host is executing printing when the predetermined first instruction is received;

specifying printing apparatuses which are performing printing and for which the printer host is executing printing if it is judged that the printer host is executing printing;

acquiring state information concerning the printing apparatuses specified which are performing printing and for which the printer host is executing printing;

displaying predetermined information included in the state information acquired of only the printing apparatuses if it judged that the printer host is executing printing;

displaying a screen for receiving designation of a printing apparatus and information which should be displayed when a predetermined second instruction is received; and if the printer host is not executing printing for any printing apparatus at the time when the predetermined first instruction is received, (1) acquiring state information concerning the printing apparatus designated, and (2) displaying the information designated among pieces of information included in the state information.

\* \* \* \* \*